United States Patent
Hukkanen

(10) Patent No.: US 11,124,944 B2
(45) Date of Patent: Sep. 21, 2021

(54) ARRANGEMENT IN ARTICULATED JOINT OF WORK MACHINE

(71) Applicant: PONSSE OYJ, Vieremä (FI)

(72) Inventor: Ville Hukkanen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 716 days.

(21) Appl. No.: 15/772,832

(22) PCT Filed: Nov. 4, 2016

(86) PCT No.: PCT/FI2016/050783
§ 371 (c)(1),
(2) Date: May 2, 2018

(87) PCT Pub. No.: WO2017/077197
PCT Pub. Date: May 11, 2017

(65) Prior Publication Data
US 2018/0320336 A1    Nov. 8, 2018

(30) Foreign Application Priority Data
Nov. 6, 2015 (FI) ........................................ 20155818

(51) Int. Cl.
*E02F 9/00* (2006.01)
*E02F 9/22* (2006.01)
(Continued)

(52) U.S. Cl.
CPC ............ *E02F 9/006* (2013.01); *E02F 9/2275* (2013.01); *F16C 11/045* (2013.01); *F16C 33/10* (2013.01); *F16N 1/00* (2013.01)

(58) Field of Classification Search
CPC ........ E02F 9/006; E02F 9/0841; E02F 9/2275; F16C 11/045; F16C 33/10; F16C 33/102;
(Continued)

(56) References Cited

U.S. PATENT DOCUMENTS 4,022,536 A    5/1977  Piepho et al.
4,629,350 A    12/1986 Siewart et al.
(Continued)

FOREIGN PATENT DOCUMENTS

CN    104005435 A      8/2014
DE    10309792 A1 *   9/2004  .............. E02F 9/006
(Continued)

OTHER PUBLICATIONS

First Office Action dated Jan. 2, 2020, by the Chinese Patent Office in corresponding Chinese Patent Application No. 201680064572.3, and an English Translation of the Office Action. (19 pages).
(Continued)

*Primary Examiner* — Josh Skroupa
(74) *Attorney, Agent, or Firm* — Buchanan Ingersoll & Rooney PC

(57) ABSTRACT

An arrangement in an articulated joint of a work machine wherein at least two machine parts are rotatably fastened to each other with a conical sleeve shaft joint in which a conical sleeve is pressed against a conical sleeve shaft by an intermediate plate. This intermediate plate includes members for receiving a channel and for connecting the channel to a lubrication channel. The members are formed on the intermediate plate's outer casing which connects a counter-surface to a pressing surface on the side of the conical sleeve to provide a continuous passage for the conical sleeve shaft of the articulated joint.

14 Claims, 5 Drawing Sheets

(51) Int. Cl.
*F16N 1/00* (2006.01)
*F16C 11/04* (2006.01)
*F16C 33/10* (2006.01)

(58) Field of Classification Search
CPC .............. F16C 33/1025; F16C 33/1045; F16C 33/1055; F16N 1/00; F16N 7/385; F16N 2210/04; F16N 2210/14; Y10T 403/32861; Y10T 403/32877; Y10T 403/32893; Y10T 403/32901; Y10T 403/32909; Y10T 403/32918; Y10T 403/32926
USPC ........ 403/150, 152, 154, 155, 156, 157, 158
See application file for complete search history.

(56) References Cited

U.S. PATENT DOCUMENTS

| | | | | |
|---|---|---|---|---|
| 4,634,299 | A * | 1/1987 | Svensson | E02F 9/006 384/206 |
| 5,551,794 | A * | 9/1996 | Aarre | F16C 11/045 403/374.4 |
| 8,221,020 | B2 | 7/2012 | Svensson et al. | |
| 8,459,894 | B2 * | 6/2013 | Svensson | F16C 11/045 403/154 |
| 10,322,413 | B2 * | 6/2019 | Raihala | F16C 11/045 |
| 10,781,851 | B2 * | 9/2020 | Heintz | F16C 11/045 |
| 2009/0199365 | A1 * | 8/2009 | Svensson | F16C 11/045 16/386 |
| 2009/0250581 | A1 | 10/2009 | Svensson et al. | |
| 2010/0158601 | A1 | 6/2010 | Salas et al. | |
| 2014/0145429 | A1 * | 5/2014 | Chung | E02F 9/006 285/144.1 |

FOREIGN PATENT DOCUMENTS

| | | | |
|---|---|---|---|
| DE | 19905299 B4 * | 4/2010 | ............ F16C 11/045 |
| GB | 191226240 A | 7/1913 | |
| JP | 63-152020 U | 10/1988 | |
| JP | 02-18916 A | 1/1990 | |
| JP | H 04-107308 A | 4/1992 | |
| JP | H 04-347099 A | 12/1992 | |
| JP | H 06-014251 U | 2/1994 | |
| JP | 08-158402 A | 6/1996 | |
| JP | 2000-234614 A | 8/2000 | |
| WO | WO 1990/015262 A1 | 12/1990 | |

OTHER PUBLICATIONS

International Search Report (PCT/ISA/210) dated Dec. 19, 2016, by the Finnish Patent Office as the International Searching Authority for International Application No. PCT/FI2016/050783.
Written Opinion (PCT/ISA/237) dated Dec. 19, 2016, by the Finnish Patent Office as the International Searching Authority for International Application No. PCT/FI2016/050783.
Search Report dated Jul. 22, 2016, by the Finnish Patent Office for Application No. 20155818.
The extended European Search Report dated Jun. 6, 2019, by the European Patent Office in corresponding European Application No. 16861677.9. (8 pages).

* cited by examiner

ARRANGEMENT IN ARTICULATED JOINT OF WORK MACHINE

BACKGROUND OF THE INVENTION

The invention relates to an arrangement in a joint of a work machine, with which work machine parts are rotatably joined to each other.

Previously, rotating joints in work machines have been primarily made by using a conventional pin joint. In such a case, articulated arms have been joined to each other by a pin which penetrates mounting cheeks for one articulated arm and a sleeve for the other articulated arm, arranged between the mounting cheeks. This pin joint also comprises either a grease nipple arranged at the end of the pin or a lubrication pipe for supplying lubricant to the sleeve. Lubricating is needed because the surfaces moving against each other would otherwise be subjected to excessive loading friction and thus to wearing.

In addition to the joints and the sleeve surrounding the pin, also the mounting cheeks of the pin are particularly susceptible to wearing. The pin holes of these mounting cheeks wear and widen in use, whereby the pin joint of the articulation becomes looser. Such widening of the clearances of the mounting cheeks causes, for example, the bearings of the joint to wear faster and the operation of the articulation and thus the whole work machine to deteriorate.

One conventional solution for fixing looser pin joints of articulation is to fill the hole of the mounting cheeks by welding up holes of the mounting cheeks and thus increasing material at the edges of the hole. Subsequently, it has been possible to bore these holes once again to be of the correct size for a similar pin joint. However, the solution is rather expensive to implement and has not lasted very long. Further, such fixing is time-consuming and causes the machine to be out of productive operation for an unduly long period.

Therefore, a special conical sleeve pin has been provided for this kind of widening. Such known solutions are disclosed in publications U.S. Pat. No. 8,221,020 and WO 90/015262, for instance. A particular advantage of a conical sleeve pin is that, if required, it can be retightened even several times when holes of the mounting cheeks become wider, and thus a substantially clearing-free joint is achieved over and over again.

Known fastening utilizing a conical sleeve pin comprises a pin or shaft arranged through the joint sleeve and comprising, at least at its one end, a conical end portion. Further, conical sleeve pin fastening comprises a conical sleeve arranged at the conical portion of the pin. The conical end portion of the pin wedges the conical sleeve radially outwards, pressing it against the inner edges of the mounting cheek holes. Preferably, the conical sleeve comprises a cut, which allows the conical sleeve to widen outwards in the radial direction due to the wedging effect of the pin.

The conical sleeve is fastened to the end of the pin with an intermediate plate arranged upon the conical sleeve and with tightening members, such as bolts, arranged through it, with which the intermediate plate and the conical sleeve are fastened to the pin. Thus, the conical sleeve remains between the intermediate plate and the conical end of the pin, and the fastening can be tightened by means of bolts.

However, the prior art has problems so far unsolved. Such joints implemented with conical sleeve fastening also need lubrication, and the lubricant is, also in this case, supplied to the end of the pin and to the middle part of the intermediate plate. Since conical sleeve fastening comprises an intermediate plate and bolts, the fastening arrangement protrudes from the outer surfaces of the work machine parts more than in a conventional implementation. Due to the deviating structure, the pipe supplying lubricant to the conical sleeve fastening must be brought to the middle part of the intermediate plate from the top and, for example, partially over the bolts. Therefore, this lubrication pipe must be detached from the outer surface of the work machine to pass on top of bolts, through the opening in the middle of the intermediate plate, and further to the end of the pin.

The solution is often used in work machines operating in hard conditions, such as in forest machines, earth-moving machines, machines in the agricultural field and machines in the construction field. However, the solution exposes the lubrication pipe to external dents and impacts. The lubrication pipe is thus easily damaged, although its purpose is specifically to decrease the need for maintenance by providing an automatic lubrication arrangement or at least the option of attending to lubrication from a location accessed more easily from the viewpoint of regular maintenance, such as lubricating from the ground. Hence, the present structural solution of a lubrication pipe does not work optimally in connection with conical sleeve fastenings. Problems occur particularly in conditions where machines and joint parts may be exposed to external forces.

BRIEF DESCRIPTION OF THE INVENTION

Preferred embodiments of the invention are disclosed in the dependent claims.

An essential idea of the invention is based on bringing a lubrication pipe or the like channel means protected by an intermediate plate provided by a conical sleeve fastening to a lubrication channel in a conical sleeve. Thus, the channel means can be conducted along a work machine part and the body of an articulated arm formed by it to the lubrication channel without a substantial need to lift the channel means off the body surface. At the same time, the intermediate plate protects the critical joint between the channel means and the lubrication channel.

An advantage of the invention is that the channel means is protected against external impacts and dents, whereby damages caused by external dents are reduced. It is also significantly easier to provide the channel means with a protective structure or to guide the channel means into a recess formed in the body for this purpose.

The solution also allows the reliability of the lubrication system to be increased and, at the same time, the maintenance interval for the lubrication system of the joint is extended.

When solutions according to the invention are utilized, it is still possible to retighten the joint by means of conical sleeve fastening but, at the same time, lubrication system damages caused by external impacts are avoided, which means that the need for maintenance of the machine is decreased.

Furthermore, it can be mentioned as a particular advantage that the implementation of the invention does not require new additional parts for the structure or a more complex structure. At its simplest, the invention can be implemented such that the intermediate plate according to the invention is arranged in the conical sleeve fastening for the lead-through of the channel means. The solution according to the invention can also be arranged in previous prior-art conical sleeve pins by merely taking into use an intermediate plate of a new type according to the invention.

The solution according to the invention also allows other connection to the joint in a preferred manner. Thus, the channel means and the lubrication channel may be utilized to provide a data communication passage, for instance. Through this, also various pressure mediums can be supplied to the conical sleeve shaft. Other advantages provided by the invention are disclosed in the following more detailed description of specific embodiments of the invention.

LIST OF FIGURES

In the following, some preferred embodiments of the invention will be explained in more detail and with reference to the accompanying drawing, in which FIG. 1 shows an example of the operating environment of the present arrangement;

DETAILED DESCRIPTION OF PREFERRED EMBODIMENTS

The present figures do not show the arrangement in a joint of a work machine in scale but the figures are schematic, illustrating the general structure and operation of preferred embodiments. The structural parts shown by reference numbers in the attached figures then correspond to the structural parts marked by reference numbers in this specification.

Figure 1:
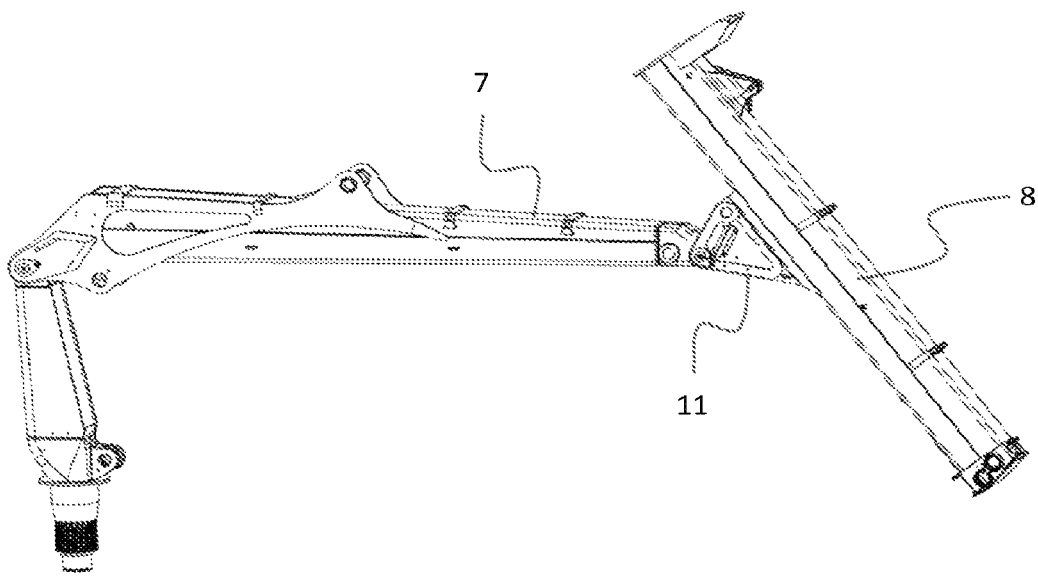
Figure 2:
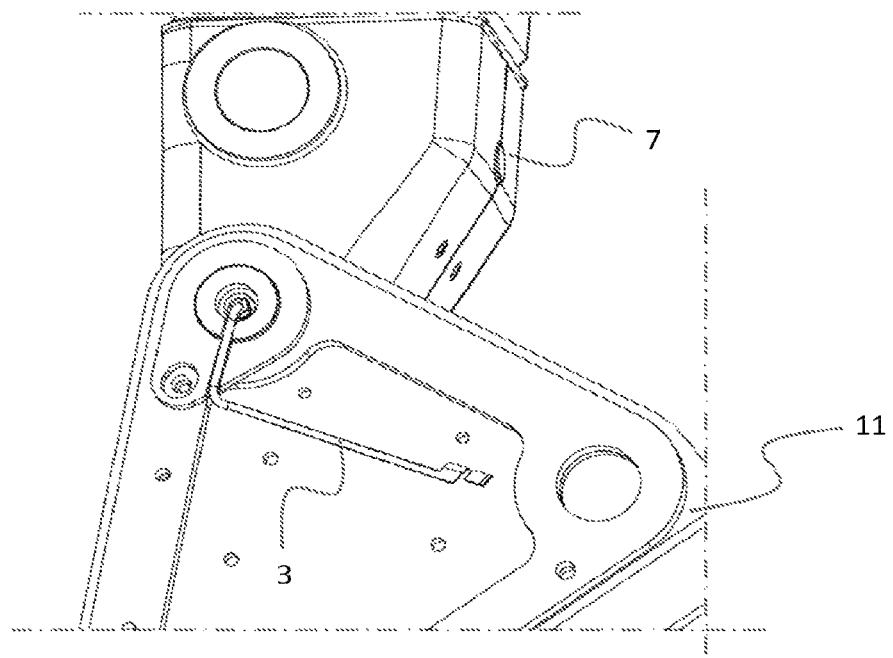
FIG. 2 shows guiding a lubrication pipe to a conventional joint in prior art.
Figure 3:
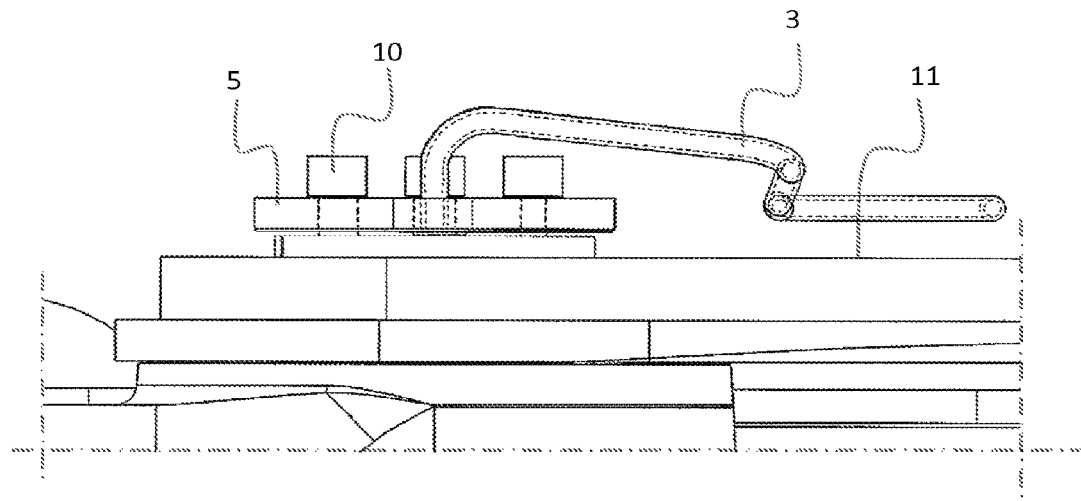
FIG. 3 shows guiding a lubrication pipe to a conical sleeve shaft in prior art.
Figure 4:
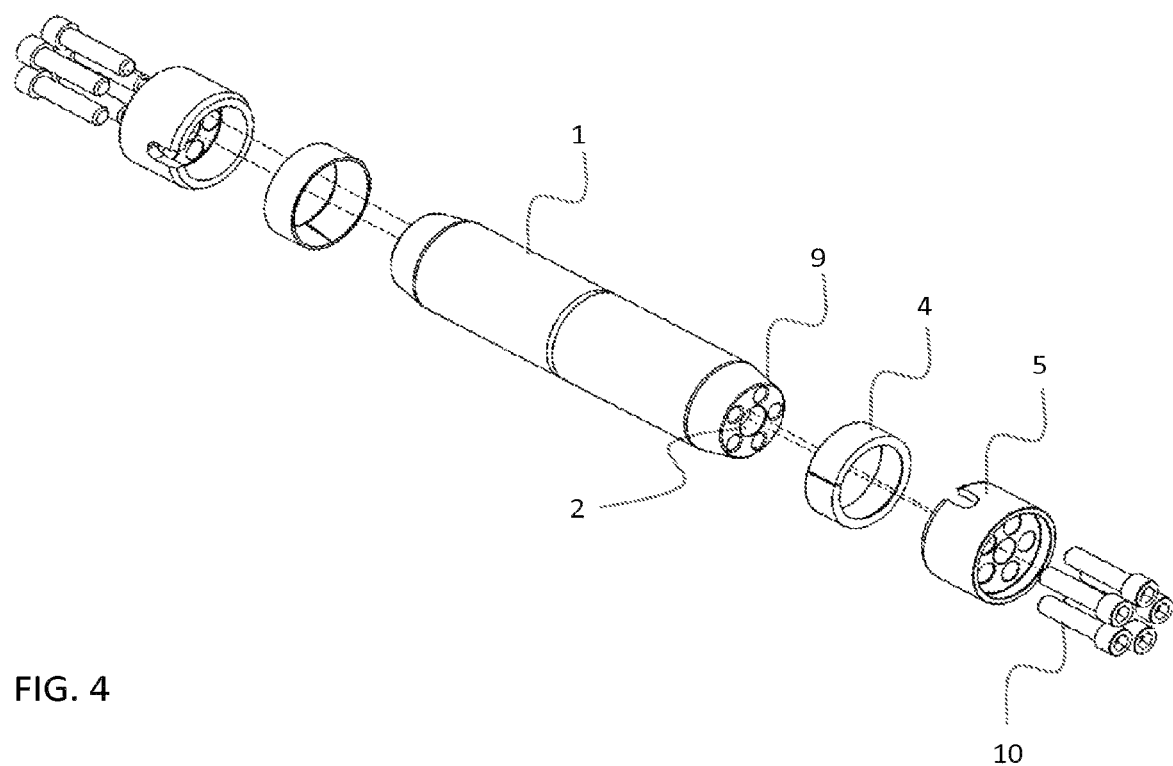
FIG. 4 shows a conical sleeve shaft used in a joint and known as such, provided with an intermediate plate according to the invention.
Figure 5:
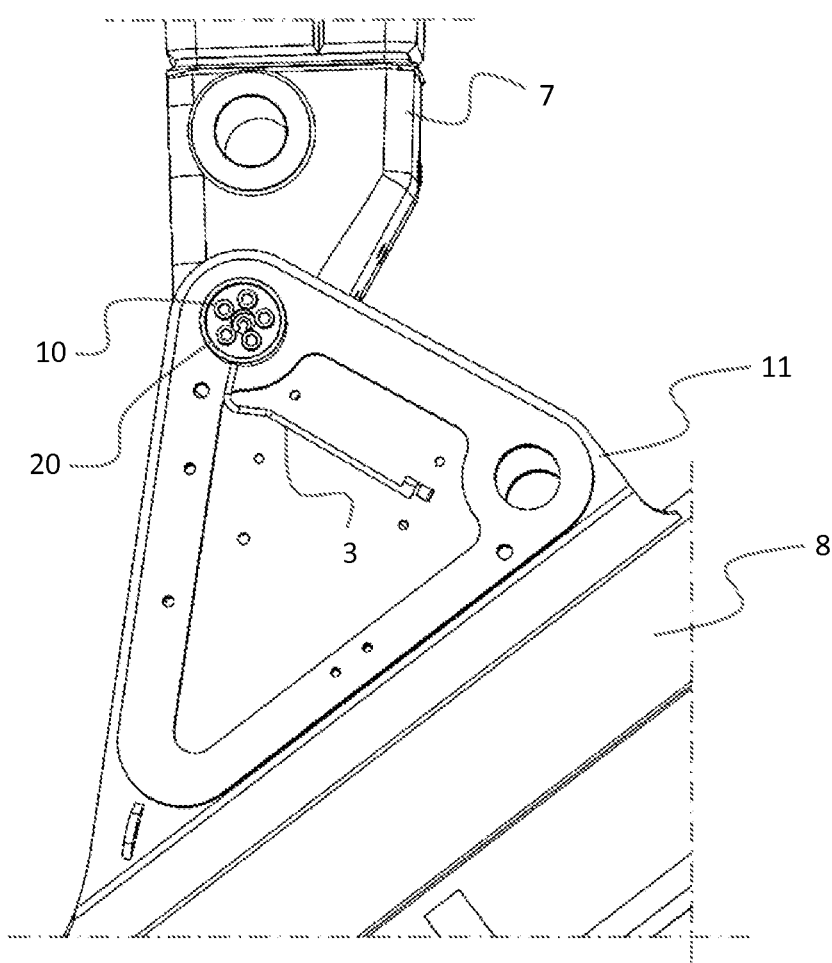
FIG. 5 shows a conceptual view of the present solution.
Figure 6:
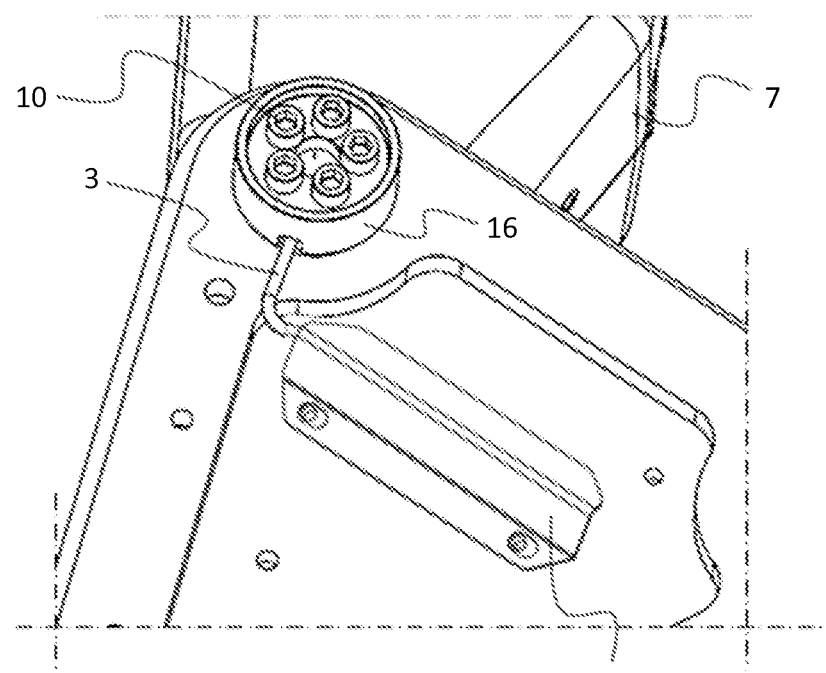
FIG. 6 shows a detailed view of the solution according to FIG. 5.

The known solution according to FIGS. 2 and 3 comprises an arrangement in which two machine parts are articulated to each other with a conical sleeve shaft 1 according to FIG. 4. At the end of this conical sleeve shaft, there is an end opening of a lubrication channel 2, to which opening a channel means 3 is connected to supply lubricant into the lubrication channel passing along the central axis of the conical sleeve shaft. The channel means is guided to the lubrication channel from above the conical sleeve shaft and a conical sleeve 4 placed against it as well as an intermediate plate 5 pressing the conical sleeve. Since it significantly protrudes from a machine part body 6, the channel means is very susceptible to damage when hitting surrounding trees or the like obstacles.

To solve problems of the prior art, an arrangement in an articulated joint of a work machine is provided which is schematically shown in FIGS. 5 to 8. In the following, the solution is described by using the same reference numbers as above. Thus, an arrangement of this type comprises fastening means for joining at least two machine parts, i.e. parts 7 and 8, rotatably to each other. As described above, such fastening means comprise a conical sleeve shaft 1, at least one end of which there is a conical end portion 9; compare FIG. 4. In this conical end portion, a conical sleeve 4 is arranged which is pressed by means of an intermediate plate 5 placed against the conical sleeve in the direction of the conical sleeve shaft. Pressing is achieved by at least one tightening member 10 which is connected to the conical sleeve shaft and which forces the conical sleeve to slide along the conical end portion of the conical sleeve shaft. Operation of the tightening members may, if required, be made more efficient by mounting spring washers between the members and the intermediate plate.

The conical sleeve shaft 1 may be implemented as having either one or several parts, and it may also be implemented such that both shaft ends have said conical end portions 9 with conical sleeves 4, intermediate plates 5 and tightening members 10. On the other hand, one end of the conical sleeve shaft may comprise, instead of a conical end portion, mechanical fastening with form locking to fasten the conical sleeve shaft to a mounting cheek 11.

In order to be able to supply for instance lubricant to the conical sleeve shaft 1, the shaft is provided with a special lubrication channel 2 whose end opening seen in FIG. 4 is accessible through the intermediate plate 5. The lubricant is supplied to this end opening in a manner known as such by means of a channel means 3 brought to the joint.

Figure 7:
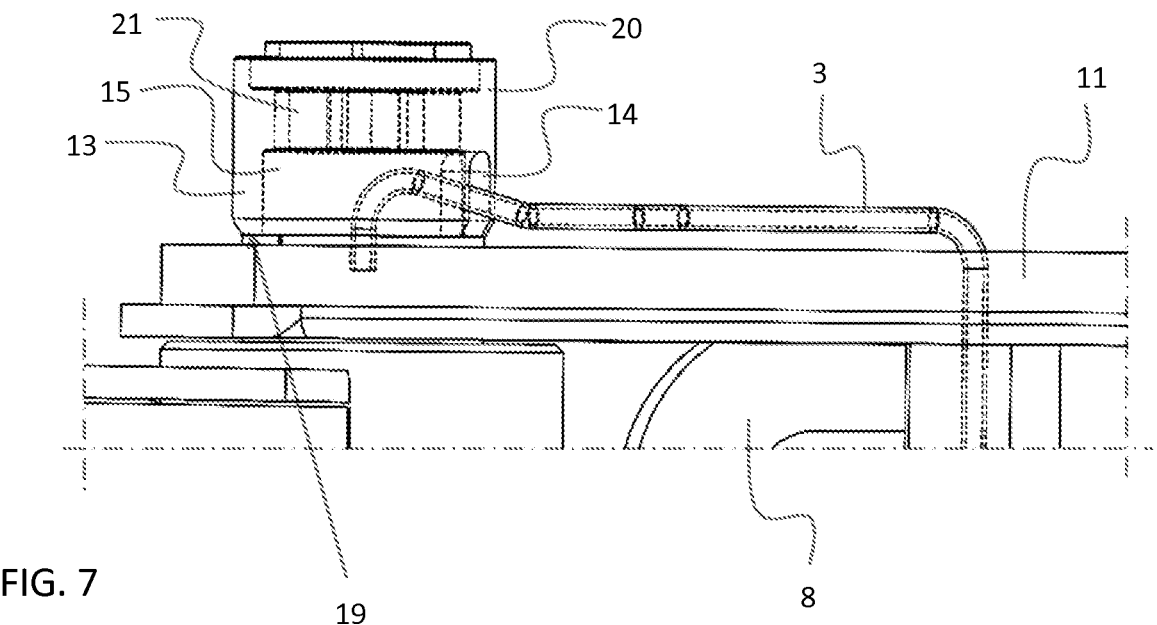
FIG. 7 shows a partial section of a solution for guiding a lubrication pipe to a conical sleeve shaft.

To protect it in the best possible way against external effects, this channel means 3 is guided to the intermediate plate 5 along the outer surface of the machine part 8 and/or the mounting cheek 11 arranged on it, as shown in FIG. 7. Thus, the intermediate plate is, in one preferred embodiment, arranged to comprise a collar 13 protruding from its counter-surface 12 towards the conical sleeve. The collar is provided with at least one opening 14, through which the channel means can be guided into a cavity 15 between the intermediate plate and the conical sleeve 4, where the channel means is further connectable to the lubrication channel 2 of the conical sleeve shaft 1. The solution is shown in FIG. 7, for instance.

Figure 8:
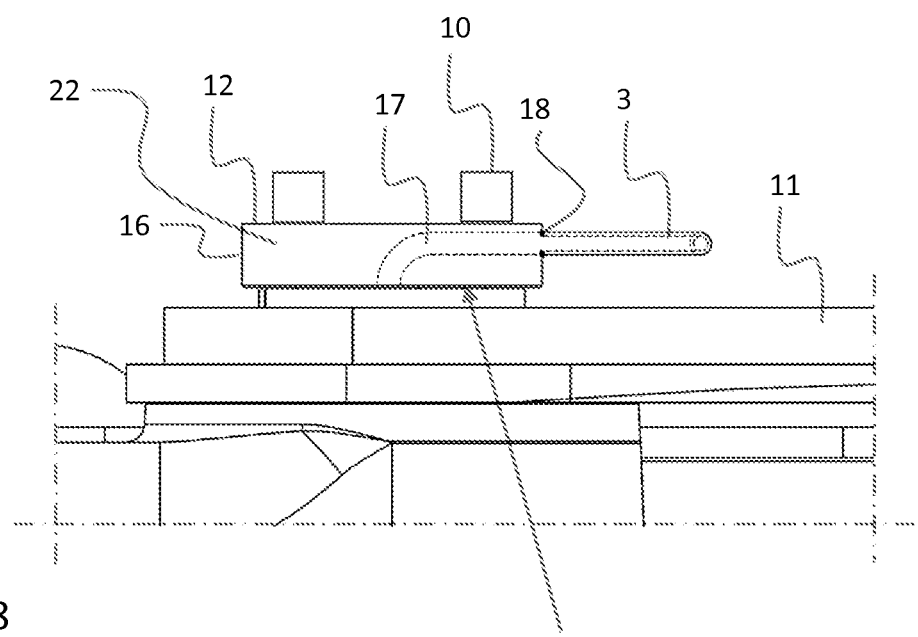
FIG. 8 shows a second, alternative solution for guiding a lubrication pipe to a conical sleeve shaft through an intermediate plate.

On the other hand, the intermediate plate 5 may, according to a second preferred embodiment, also comprise a transfer channel 17 machined to extend from the plate's outer casing 16 substantially in the direction of the counter-surface, the transfer channel being connectable to the lubrication channel 2 of the conical sleeve shaft 1. Hence, the channel means 3 guided along the outer surface of the machine part 8 and/or the mounting cheek 11 arranged on it is connectable to a connecting member 18 on the outer casing of the intermediate plate to supply lubricant into the lubrication channel through the transfer channel. The solution is shown in FIG. 8. As can be seen from this figure, the connecting member is provided on the outer casing 16, which, in the embodiment of the figure, connects the intermediate plate to a pressing surface 19 of the counter-surface on the side of the conical sleeve 4.

In the intermediate plate 5 according to the preceding embodiment, the transfer channel 17 can also be provided by forming a groove on the counter-surface 12 or the pressing surface 19. Lubricant can then be supplied to the end opening of the lubrication channel 2 directly by utilizing a continuous channel means 3.

The channel means can also be equipped with what is called a transfer channel 17 by providing the intermediate plate with a cut extending from its outer casing 16 to the end opening of the lubrication channel 2. Thus, lubricant can be supplied into the lubricant channel by arranging the channel means 3 in such a cut. Utilizing a continuous channel means allows thus risks of damage and leaks related to additional joints to be avoided.

The intermediate plate 5 may also comprise a protective collar 20 which is arranged to substantially surround one or more tightening members 10 or parts thereof protruding from the counter-surface 12 of the intermediate plate. The protective collar is visible in FIGS. 6 and 7, for example. Embedding the outer ends of the tightening members inside the outer edge of the structure in this way allows also said ends to be protected from external impacts. This is one factor that ensures that the joint of the tightening members cannot become looser. It is also easier to tighten tightening members protected by a collar and, if required, to detach them as their ends have not been damaged in use by hitting various obstacles. The first preferred embodiment of the intermediate plate 5 as described above comprises a substantially cylindrical body. The body then has, at its first end, a recess 21 formed by the protective collar 20 to receive the end of the tightening member 10. A second end of the body is provided with a cavity 15 on the side of the conical sleeve to receive the channel means 3. Thus, the recess and the cavity are separated from each other by a flange 22 forming the counter-surface 12 and the pressing surface 19. In this way, the channel means can be mounted to be protected under the flange.

According to a third embodiment, the intermediate plate 5 comprises, in the same way, a substantially cylindrical body. According to this embodiment, the body comprises a recess 21 formed solely by the protective collar 20 to receive an end of the tightening member 10. Then, the channel means 3 is to be guided to the lubrication channel 2, which pierces the intermediate plate, between one or more fastening members on the counter-surface 12 of the intermediate plate.

By means of the above-described members of the intermediate plate for receiving the channel means, denoted by reference numbers 14, 16, 18, the channel means 3 can be provided with a continuous passage extending from the outer casing of the intermediate plate 5 as far as to the end opening of the lubrication channel 2 of the conical sleeve shaft 1 in the articulated joint. In the solutions presented, the tightening members 10 guiding the operation of the conical sleeve shaft are tightened specifically to the conical sleeve shaft. This provides the advantageous effect that when the conical sleeve shaft is tightened, the end opening of the lubrication channel always remains at the same level as the surface of the surrounding machine part. Thus, the lubrication channel 2 at the end of the conical sleeve shaft remains free of obstacles and in place every time tightening is carried out.

Figure 9:
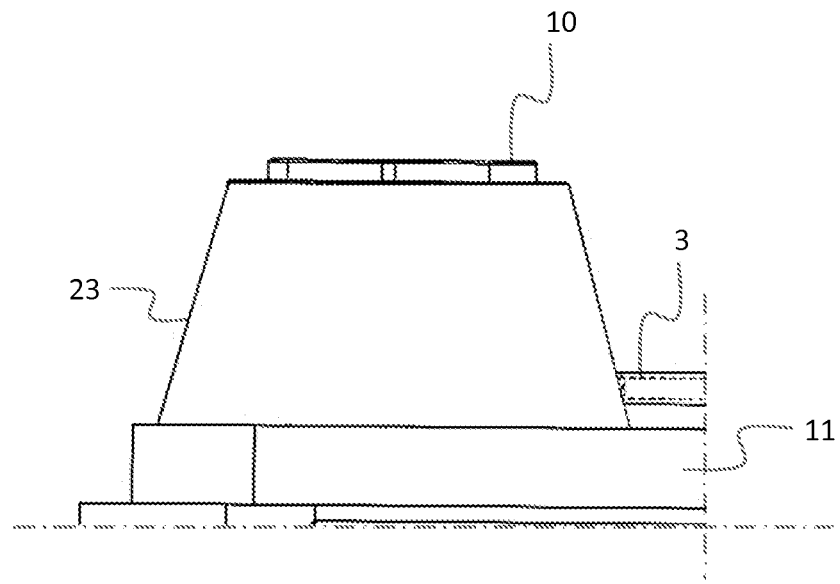
FIG. 9 shows a conceptual view of a structure of an intermediate plate casing.
Figure 10:
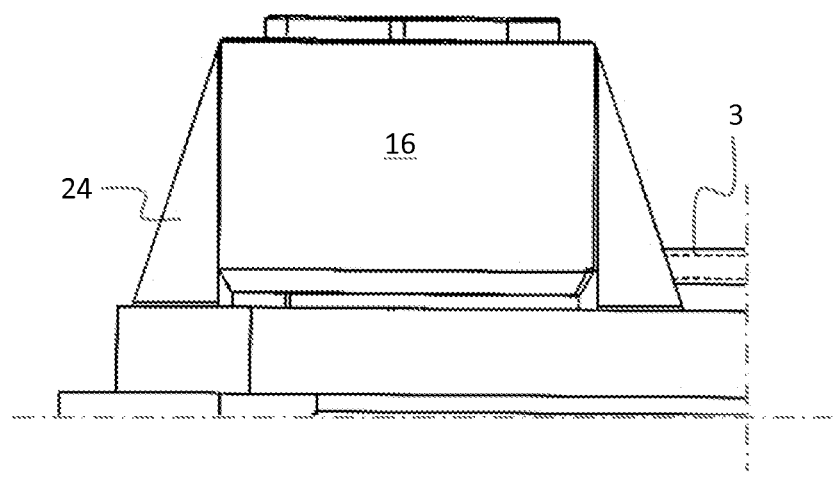
FIG. 10 shows a conceptual view of a second, alternative structure of an intermediate plate casing.

When the purpose of the arrangement is to prevent branches, cables or the like in the vicinity of the work machine from getting stuck on parts protruding from the work machine, it is preferable to also shape the intermediate plate 5 or its collar 19 such that sticking can be minimized. On the other hand, particularly in forest machine operation in thinning, correct shaping of the intermediate plate and/or its collar can reduce susceptibility to damage tree trunks intended to be left to grow in a harmful way. Thus, the collar of the intermediate plate may, in this preferred embodiment, comprise a truncated cone 23 with a substantially hollow cross-section or another shape protruding from the outer surface of the machine, which provides a cross-section widening towards the outer surface of the machine part. This type of embodiment is shown in FIG. 9. Of course, a similar final result is achieved by arranging, around the collar of the intermediate plate, a ring 24 of the shape of a truncated cone with a hollow cross-section, or the like. This type of embodiment is, in turn, shown in FIG. 10.

Not only the fastening members but also the channel means can be provided with a protective structure 25, which makes it possible to avoid external impacts that the means would possibly otherwise be subjected to.

The above arrangement is applicable to be used in work machines known as such. The arrangement is particularly suitable for a forest machine.

A person skilled in the art will find it obvious that, as technology advances, the basic idea of the invention may be implemented in many different ways. The invention and its embodiments are thus not restricted to the above-described examples but may vary within the scope of the claims.

Thus, by utilizing the above arrangement, a simple and protected connection for a joint between two machine parts can be achieved. The continuous passage formed by the lubrication channel and channel means and properly protected against external impacts may then be utilized for a wide variety of purposes in addition to supplying lubricant. Thus, for example, a data communication passage transmitting different measurement data or, additionally, for instance a supply voltage required by a sensor arrangement or a voltage required by another actuator can be achieved and arranged in the joint. Likewise, along the passage, various pressure mediums can be conducted to the conical sleeve shaft or, if required, through it, for instance to supply pressure medium in a protected manner via a rotating joint.

The invention claimed is:

1. An arrangement in an articulated joint of a work machine for joining at least two machine parts rotatably to each other, the arrangement comprising:
    a conical sleeve shaft, at one end of which there is a conical end portion;
    a lubricant channel in the conical sleeve shaft;
    a conical sleeve configured to be arranged in the conical end portion of the conical sleeve shaft;
    an intermediate plate configured to be mounted against the conical sleeve arranged on the conical sleeve shaft, the intermediate plate having a counter-surface at one axial end and a pressing surface at another axial end and a collar having an outer surface formed between the counter-surface and the pressing surface; and
    at least one tightening member configured to be joined to the conical sleeve shaft to press the intermediate plate by the counter-surface thereof against the conical sleeve, wherein the intermediate plate includes members for receiving a channel means and for connecting the channel means to the lubricant channel,
    which members for receiving the channel means are formed on the outer surface of the collar of the intermediate plate which connects the counter-surface to the pressing surface,. on a side of the conical sleeve, to provide a continuous passage to the conical sleeve shaft.

2. An arrangement as claimed in claim 1, wherein the members for receiving the channel means comprise:
    at least one opening for guiding the channel means into a cavity between the intermediate plate and the conical sleeve; and
    a connection of the channel means to the lubrication channel of the conical sleeve shaft.

3. An arrangement as claimed in claim 1, wherein the members for receiving the channel means comprise:

a transfer channel formed in the intermediate plate and connectable to the lubricant channel of the conical shaft.

4. An arrangement as claimed in claim 3, wherein the outer casing on the intermediate plate comprises:
a connecting member for connecting the channel means to the transfer channel.

5. An arrangement as claimed in claim 2, wherein the collar protrudes from the counter-surface and is arranged to substantially surround a part of the tightening member that protrudes from the counter-surface.

6. An arrangement as claimed in claim 1, wherein the intermediate plate comprises:
a cross-section widening towards an outer surface of the machine part.

7. An arrangement as claimed in claim 1, in combination with two machine parts to be joined, the arrangement comprising:
a ring arranged to surround the intermediate plate and having a cross-section widening towards an outer surface of at least one of the machine parts.

8. An arrangement as claimed in claim 1, wherein the conical sleeve shaft comprises, at its one end:
a mechanical fastening with form locking for fastening the conical sleeve shaft to a mounting cheek.

9. An arrangement as claimed in claim 1, wherein the channel means is a lubrication pipe for supplying lubricant into the channel.

10. An arrangement as claimed in claim 1, wherein the channel means is configured as a data communication passage to provide a data communication passage for an articulated joint.

11. An arrangement as claimed in claim 1, wherein the channel means is configured to supply pressure medium to the conical sleeve shaft.

12. An arrangement as claimed in claim 1, wherein the channel means is configured to provide a supply voltage for a sensor system, or for another actuator of an articulated joint.

13. A work machine comprising:
a work machine frame; and
an arrangement as claimed in claim 1.

14. A forest machine comprising:
a forest machine frame; and
an arrangement as claimed in claim 1.

* * * * *